(12) United States Patent
Gates

(10) Patent No.: US 12,721,309 B2
(45) Date of Patent: Sep. 1, 2026

(54) COMBINATION FEEDER

(71) Applicant: All Seasons Feeders, Ltd., San Antonio, TX (US)

(72) Inventor: Zach Gates, San Antonio, TX (US)

(73) Assignee: All Seasons Feeders, Ltd., San Antonio, TX (US)

( * ) Notice: Subject to any disclaimer, the term of this patent is extended or adjusted under 35 U.S.C. 154(b) by 72 days.

(21) Appl. No.: 18/382,941

(22) Filed: Oct. 23, 2023

(65) Prior Publication Data

US 2025/0127143 A1 Apr. 24, 2025

(51) Int. Cl.
*A01K 5/02* (2006.01)

(52) U.S. Cl.
CPC .......... *A01K 5/0291* (2013.01); *A01K 5/0225* (2013.01)

(58) Field of Classification Search
CPC ........ A01K 5/0225–0241; A01K 5/0275–0291
See application file for complete search history.

(56) References Cited

U.S. PATENT DOCUMENTS 3,195,508 A * 7/1965 Lehman ............... A01K 5/0291 119/57.91
4,986,220 A * 1/1991 Reneau ................ A01K 5/0225 119/57.91
5,143,289 A * 9/1992 Gresham .............. A01K 5/0291 239/70
5,333,572 A * 8/1994 Nutt ......................... A01K 5/02 239/397.5
5,820,035 A * 10/1998 Johnson ............... A01C 17/005 251/272
7,717,063 B2 * 5/2010 Chang .................. A01K 39/012 119/51.13
8,607,736 B1 * 12/2013 Plant ...................... A01K 61/80 119/57.91
8,833,303 B1 * 9/2014 Linder ................. A01K 5/0225 119/57.91
9,301,495 B1 * 4/2016 Bogart ................... A01K 5/005
9,491,939 B2 * 11/2016 Myers ................... E01C 19/203
9,635,835 B1 * 5/2017 West ...................... A01K 5/004
9,700,014 B1 * 7/2017 Bogart ................. A01K 5/0225
11,856,925 B1 * 1/2024 Sanderford .......... A01K 5/0225
2009/0205573 A1 * 8/2009 Briere ...................... A01K 5/02 119/57.91
2010/0307421 A1 * 12/2010 Gates .................. A01K 5/0225 119/57.91

(Continued)

FOREIGN PATENT DOCUMENTS

GB 2549268 A * 10/2017 ........... A01K 5/0225
KR 20210136756 A * 11/2021 ........... A01K 39/012

*Primary Examiner* — Marisa V Conlon
*Assistant Examiner* — Hae Rie Jessica Byun
(74) *Attorney, Agent, or Firm* — Kirby Drake

(57) ABSTRACT

A combination feeder can selectively broadcast feed, time-feed into feed troughs, and use an adaptable vibrator plate with a motor to feed a variety of feeds. A feeding device can comprise a hopper, a feed trough, a conversion box assembly that can be connected to the hopper, a motor, and one or more feed outlet openings connected to the conversion box assembly. The conversion box assembly can have one or more flaps that can be transitioned between a raised and a lowered position allowing the feeding device to transition from trough feeding to broadcast feeding.

11 Claims, 10 Drawing Sheets

(56) References Cited

U.S. PATENT DOCUMENTS

| | | | | |
|---|---|---|---|---|
| 2012/0085289 | A1* | 4/2012 | Quiring | A01K 5/0225 119/57.91 |
| 2015/0359191 | A1* | 12/2015 | Eakin | A01K 5/0225 119/52.1 |
| 2018/0249678 | A1* | 9/2018 | Chang | A01K 5/0291 |
| 2018/0279579 | A1* | 10/2018 | Alcoser | H02J 7/35 |
| 2019/0090473 | A1* | 3/2019 | West | A01M 29/30 |
| 2023/0032509 | A1* | 2/2023 | Michalec | A01K 5/0225 |
| 2024/0423160 | A1* | 12/2024 | Gleaton | B65G 65/40 |

* cited by examiner

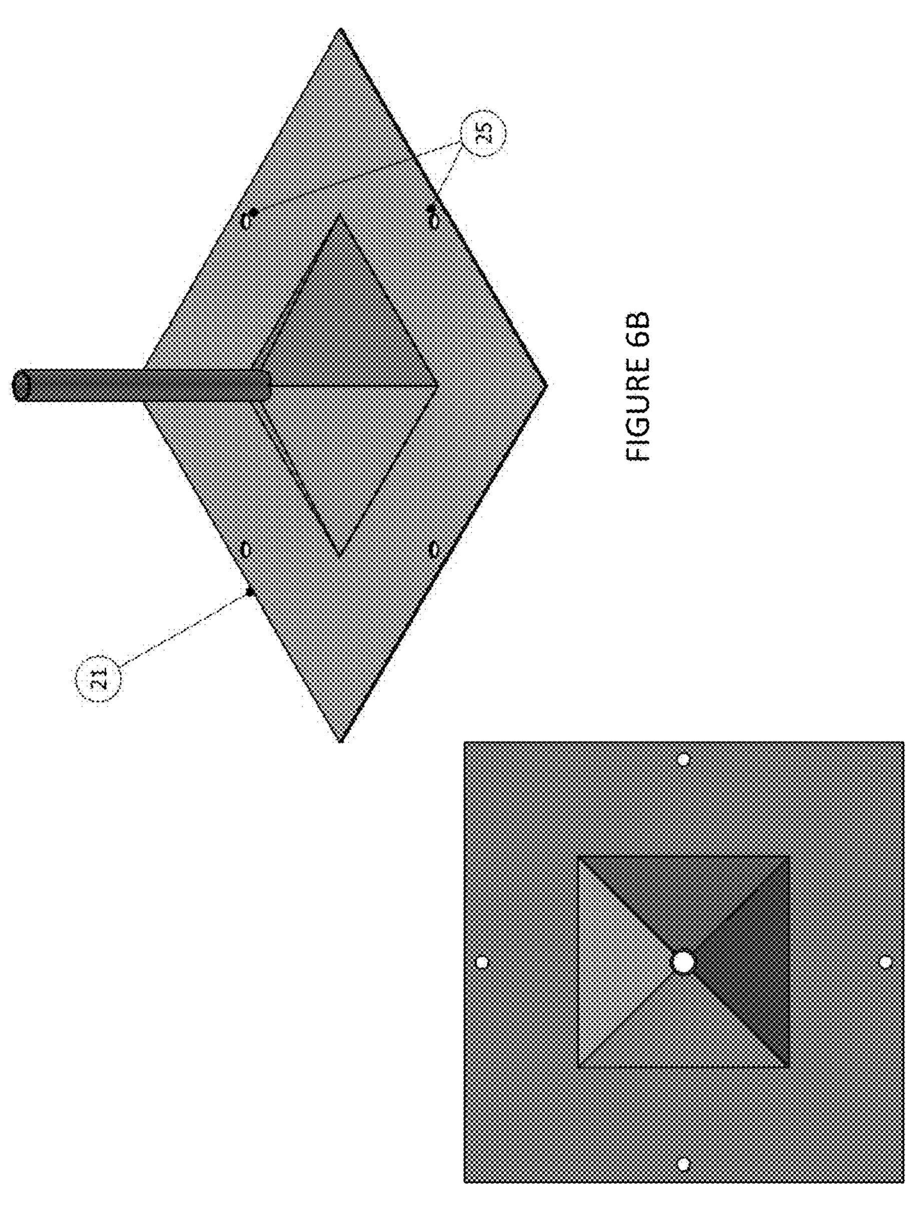
FIGURE 6B
FIGURE 6C
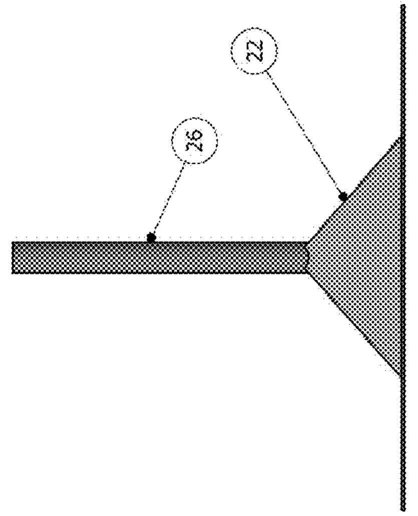
FIGURE 6A

COMBINATION FEEDER

FIELD OF THE DISCLOSURE

The present disclosure generally relates to farm equipment, and more particularly to a feeding device for livestock, wildlife, and/or exotic animals.

BACKGROUND

Feed devices for livestock have been used for a long time to control the amount of feed livestock and other animals have at a given time. These feeders have often used gravity to pull feeds from a hopper into a trough, with a simple opening and closing of a door to control the release of feed from the hopper. More modern versions of these feeders have used spinning plates to assist the feed through the feeder and into the trough. However, many cattle feeds and other exotic feeds can be large, cotton-seed-based, and can contain molasses which can be hard to feed through a spinning plate. Further, most of these feeds can only be fed through feeders by free choice, which can cause animals to overeat which can be costly and may cause harm due to overconsumption. Many other systems using plates, weights, wheels, and other devices have attempted to improve the systems used to feed livestock.

Feeders may be used for hunting, though these devices tend to broadcast feed out across the ground to attract livestock, wildlife, and/or exotic animals. This has generally been frowned upon for livestock as this can cause the feed to become wet or contaminated. Users of feeding devices tend to have only one use for the system, either a feed trough or a broadcast feeder. There are users, however, who would like both types of systems and are relegated to buying more than one type of feeder to accommodate these different uses.

SUMMARY

Embodiments of the present disclosure may provide a combination feeder that can selectively broadcast feed, time-feed into feed troughs, and use an adaptable vibrator plate with motor to feed a variety of feeds. A feeding device for dispensing feed for consumption by animals according to embodiments of the present disclosure can comprise a hopper for storing the feed, a feed trough that can be positioned below the hopper for receiving the feed, a plurality of legs that can be configured to support the feeding device, a conversion box assembly that can be connected to the hopper, a motor, and one or more feed outlet openings that can be connected to the conversion box assembly. The conversion box assembly can comprise one or more flaps that can be configured to transition between a raised configuration and a lowered configuration. When the one or more flaps are in the lowered position, the feed can be broadcast in an area around the feeding device, and when the plurality of flaps are in the raised position, the feed can be directed into the feed trough.

Other embodiments of the present disclosure can provide a feeding device for dispensing feed for consumption by animals that may comprise a hopper for storing the feed, a feed trough that can be positioned below the hopper for receiving the feed, wherein the feed trough may be shaped with a depth to wall height ratio to prevent feeding by hogs, a plurality of legs that can be configured to support the feeding device, a conversion box assembly that can be connected to the hopper, a motor, and one or more feed outlet openings that can be connected to the conversion box assembly. The conversion box assembly can comprise one or more flaps that can be configured to transition between a raised configuration and a lowered configuration. When the one or more flaps are in the lowered position, the feed can be broadcast in an area around the feeding device, and when the plurality of flaps are in the raised position, the feed can be directed into the feed trough.

Other embodiments of the present disclosure can provide a feeding device for dispensing feed for consumption by animals comprising a hopper for storing the feed, a feed trough that can be positioned below the hopper for receiving the feed, a plurality of legs that can be configured to support the feeding device, a motor, and a vibration plate with motor that can be attached to the motor.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which:

FIGS. 6A-6C depict views of a vibrator plate according to an embodiment of the present disclosure.

DETAILED DESCRIPTION

The present disclosure describes a feeding device for dispensing food for livestock, wildlife, and/or exotic animal consumption. A combination feeder can broadcast corn or other feeds/grain, time feed protein or other desired feeds into feed troughs, and may include an adaptable vibrator plate with a motor that can feed a very large variety of feeds that cannot be fed by a traditional spinner plate and motor. As described herein, to broadcast corn or other feeds/grain, when the flap doors are down, a spinner plate operated through a motor can broadcast feed outside of a feed trough and onto the ground. When a user wishes to time-feed protein pellets, the doors may be hinged up to broadcast the protein within the conversion box to fall into the troughs. When using a vibrator feed plate with motor, the user may detach the feeder conversion box assembly (which may include the motor and spinner plate) from the feeder. Then, the vibrator feed plate with motor may be bolted on or otherwise attached, thereby allowing the user to feed other types of feed that may not feed through a traditional spinner plate and motor. This vibrator feed plate may feed a variety of feeds on a time schedule being powered by a battery, timer controller, and/or solar panel. The combination of functions on the feeder can be powered by a timer, battery, solar panels, and/or either a motor with an spinner plate or vibrating motor in embodiments of the present disclosure.

A feeding device according to embodiments of the present disclosure can include a hopper, a plurality of legs that can support the hopper, one or more feed outlet openings connected to the hopper, a feed trough that can be positioned below and around the hopper, a motor, and a conversion assembly box. The conversion assembly box can further comprise one or more flaps that can be configured to allow the feeding device to transition between two different configurations. A first configuration can be a broadcast configuration. The broadcast configuration can have one or more flaps in a lowered position which can distribute the feed in an area around the feeding device. A second configuration can be a trough configuration. The trough configuration can have one or more flaps in a raised position which can distribute the feed down into the feed trough. The feeding device can also have a third configuration that can comprise a removable vibrator plate with motor that can be configured to vibrate to move viscous or thick feeds through the feeding device and distribute the feed. In one embodiment, the broadcast configuration can be used for corn feeds, the trough configuration can be used for protein feeds, and the vibrator plate with motor can be used for a variety of feeds including, but not limited to, textured feeds, molasses-based feeds, and/or cotton seed feeds.

Figures 1A, 1B:
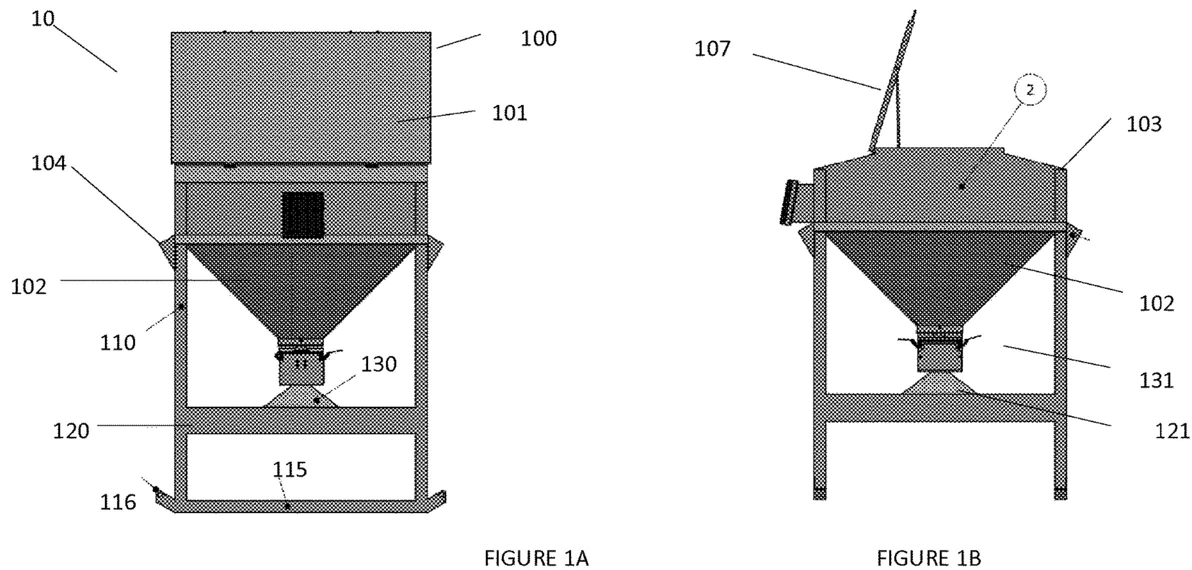
FIGS. 1A-1C depict a perspective view of a feeding device according to an embodiment of the present disclosure.
Figure 1C:
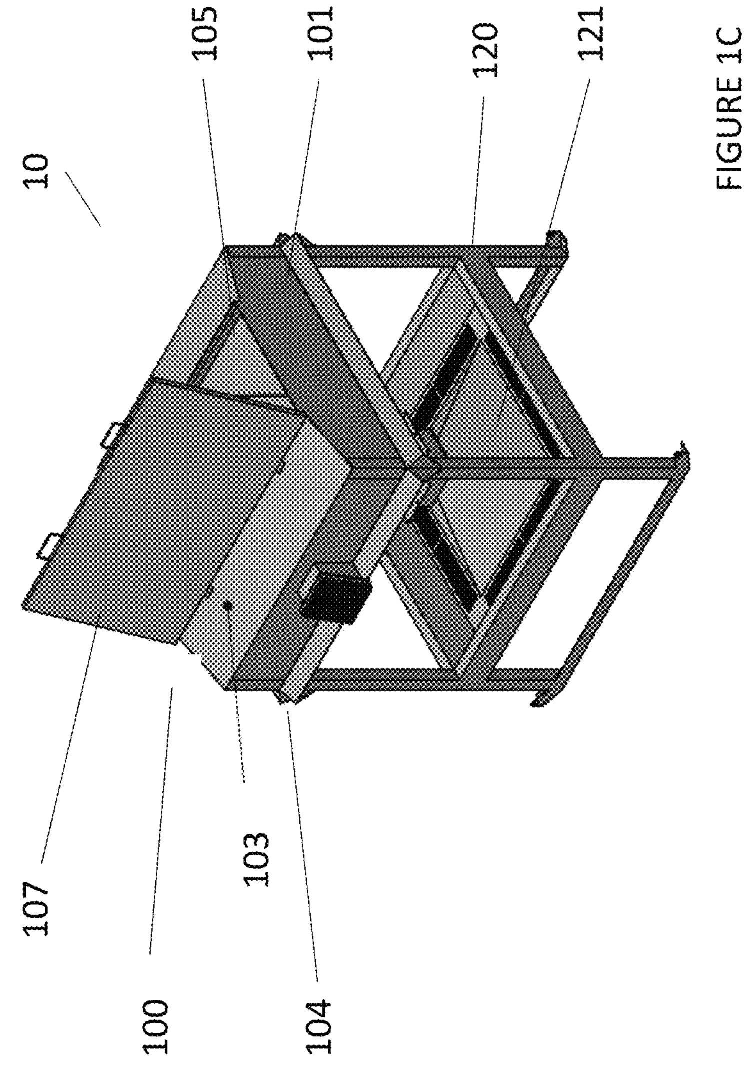

FIGS. 1A-1C depict perspective views of feeding device 10. FIGS. 1A-1C depict the whole feeding device from different angles. FIG. 1A depicts a perspective view of feeding device 10. Feeding device 10 can include hopper 100, conversion box assembly 130, feed trough 120, and a plurality of support legs 110. Hopper 100 can have top section 101 which can be configured to hold the feed, and funnel section 102 which can be configured to move the feed down toward conversion box assembly 130 for dispersal. Conversion box assembly 130 can house motor 210 (FIG. 2) and be configured to disperse the feed into trough 120 or the area around feeding device 10. Trough 120 can be positioned below conversion box assembly 130. In some embodiments, trough 120 can extend around the entire perimeter of feeding device 10 to offer the most feeding area. Other embodiments of feeding device 10 can have different arrangements of trough 120 without departing from the present disclosure. The plurality of legs 110 can be connected to at least trough 130, but in certain embodiments can also be connected to hopper 100 to provide additional stability.

Hopper 100 can comprise top section 101 and funnel section 102. Top section 101 can generally be rectangular in shape with four side walls of equal height H. Top section 101 can also have roof 103 (FIG. 1B) to protect the feed from the elements. As depicted in FIG. 1B, certain embodiments of roof 103 can be sloped to prevent water or debris from accumulating on roof 103 and potentially falling into the feed. Roof 103 can be made of the same material as the walls but can be made from other materials as well in other embodiments of the present disclosure. Roof 103 can have opening 105 (FIG. 1C) that can be used to insert feed into hopper 100. Opening 105 depicted in FIG. 1C can have a rectangular shape to allow large farm equipment to place large quantities of feed in feeding device 10 at one time. Other shapes can be used for opening 105 depending on the needs of users and the shapes that best correspond to inserting feed in hopper 100. Roof 103 can have a cover or sliding door 107 configured to fill or cover opening 105 when feed is not being placed in hopper 100. Cover or sliding door 107 can prevent water or debris from entering opening 105 when feed is not being placed in hopper 100 to preserve the quality and content of the feed. Cover or sliding door 107 can be attached to hopper 100 by a hinge, rails for sliding, other means, or combinations thereof. Top section 101 can also have rain shield 104 that may extend out away from feeding device 10. Rain shield 104 can prevent rain from getting into feed trough 120.

Funnel section 102 of hopper 100 can have a top side that can have a shape that corresponds to the shape of top section 101 of hopper 100. Funnel section 102 can then reduce in size as it extends towards feed trough 120. FIGS. 1A-1C depict an embodiment of funnel section 102 which has a shape of a four-sided pyramid. Other shapes such as a three-sided pyramid or a cone can be used for funnel section 102 in embodiments of the present disclosure. Funnel section 102 can be configured to direct the feed towards conversion box assembly 130 and feed trough 120. Top section 101 of hopper 100 can be of a size to hold a large amount of feed. This large amount may not be released all at once; therefore, funnel section 102 can be configured to reduce the size of the opening that leads to conversion box assembly 130 such that the feed will enter conversion box assembly 130 at a rate and volume that can be handled by motor 210. The size of funnel section 102 can depend both on the size of top section 101 and the size of conversion box assembly 130.

Different embodiments of the feeding device 10 can have different sized top sections 101 and conversion box assemblies 130 depending on the amount of feed needed, type of feed being used, type of livestock, wildlife, or exotic animal to be fed, and other factors. Funnel section 102 can have a greater height H2 if a larger size of top section 101 used. The greater height can allow the angle of funnel section 102 to be less severe to prevent potential blockages. Funnel section 102 can connect to conversion box assembly 130, allowing the feed to proceed into conversion box assembly 130.

In certain embodiments of feeding device 10, hopper 100 can be divided into multiple sections to hold different types of feed. Feeding device 10 can be configured with at least three distribution methods and therefore certain embodiments of hopper 100 can be designed to hold three different types of feed. Depending on the method of distribution, hopper 100 can deliver different feeds to feeding device 10.

Conversion box assembly 130 can be configured to disburse the feed as desired by the user. Conversion box assembly 130 can house motor 210 that may power feeding device 10 and can allow feed to pass through conversion box assembly 130. Conversion box assembly 130 can comprise one or more adjustable flaps 131. One or more flaps 131 can be raised or lowered depending on where the user wants to direct the feed. When one or more flaps 131 are in a raised position, the feed can pass through the conversion box assembly into feed trough 120. When one or more flaps 131 are in a lowered position, the feed can be disbursed on the ground around feeding device 10. One or more flaps 131 can be transitioned from the raised position to the lowered position and vice versa. Each one of one or more flaps 131 can be moved independently and therefore, certain of one or more flaps 131 can be in the lowered position, while other of one or more flaps 131 can be in the raised position. In this way, the user can determine which enclosures, livestock, wildlife, or exotic animals, or areas will receive feed in feed trough 120 or in the area around feeding device 10. Conversion box assembly 130 can have one or more openings 440 in a bottom to allow the feed to proceed into feed trough 120.

Feed trough 120 can be configured to collect the feed and allow livestock, wildlife, and/or exotic animals to stand at feeding device 10 to consume the feed. Feed trough 120 can be positioned below hopper 100 and conversion box assembly 130. Feed trough 120 can be positioned on one or more sides of feeding device 10. FIGS. 1A-1C depict an embodiment of feed trough 120 that is positioned on all four sides of feeding device 10. Feed trough 120 can have flat bottom 123 with sloped walls 124. Flat bottom 123 may provide a surface for the feed to rest on allowing the livestock, wildlife, and/or exotic animals to consume the food. Sloped walls 124 may prevent the feed from falling out of feed trough 120 and ensure that the feed returns to flat bottom 124. Feed trough 120 also may comprise ramp 121. Ramp 121 can be positioned directly under conversion assembly box 130 and may extend out towards feed trough 120. Ramp 121 can help distribute the feed coming from the conversion assembly box 130 to feed trough 120 and flat bottom 123.

Feeding device 10 can be supported by a plurality of support legs 110. The plurality of support legs 110 can be connected to an inside of feeding device 10. In other embodiments, the plurality of support legs 110 can be connected to an outside of feeding device 10. FIGS. 1A-1C depict an embodiment of feeding device 10 with four support legs 110 located at each corner of feeding device 10. The plurality of support legs 110 can be positioned to support feeding device 10 from falling and keep feeding device 10 level. In the embodiment of feeding device 10 depicted in FIGS. 1A-1C the plurality of support legs 110 can extend from the ground to top section 101 of hopper 100. This can provide extra stabilization to ensure that wind or weather blowing on the larger surface area of hopper 100 does not tip the balance of feeding device 10. The plurality of support legs 110 extending to top section 101 can form a higher center of gravity making feeding device 10 harder to tip or blow over. Other embodiments of feeding device 10 can have a plurality of legs 110 that extend to feed trough 120. One or more of the plurality of support legs 110 can be connected with leg skid 115. Leg skid 115 can add additional stability to the plurality of support legs 110. The plurality of support legs 110 can provide a small surface area in contact with the ground. Leg skid 115 can increase the area in contact with the ground to further increase the stability of feeding device 10.

Figure 2:
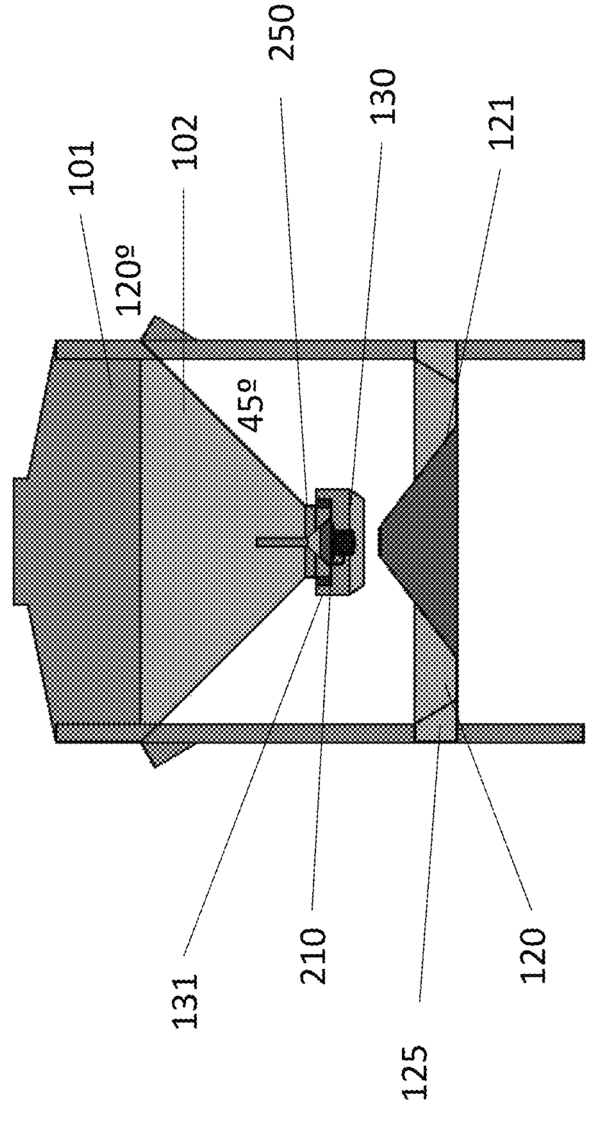
FIG. 2 depicts a cross-sectional view of a feeding device according to an embodiment of the present disclosure.

FIG. 2 depicts a cross-sectional view of feeding device 10. The cross-sectional view depicts the rectangular shape of top section 101 of hopper 100. Top section 101 of hopper 100 can be configured to hold the feed and may comprise a large portion of hopper 100. Funnel section 102 can have a greater than 30° incline in embodiments of the present disclosure, as it can extend towards conversion box assembly 130. Funnel section 102 may connect to conversion box assembly 130 to distribute the feed. In FIG. 2, one or more flaps 131 of conversion box assembly 130 are all in the raised position, meaning that the feed will be distributed down to feed trough 120.

Motor 210 can be housed in conversion assembly box 130. Motor 210 may power conversion assembly box 130 and the functioning of feeding device 10. Conversion assembly box 130 can have a cover that prevents feed from being distributed. Once motor 210 is activated, the cover can be removed, allowing feed to pass through conversion assembly box 130 and either into feed trough 120 or to the ground around feeding device 10. Conversion assembly box 130 can also have one or more distribution blades 250. One or more distribution blades 250 can be rotated by motor 210. When one or more distribution blades 250 are rotated, the one or more distribution blades 250 can push the feed through conversion box assembly 130. The faster motor 210 turns one or more distribution blades 250, the more force may be applied to the feed. In certain embodiments, one or more distribution blades 250 can be removable and can be replaced with other types of blades, scoops, cups, or combinations thereof. Motor 210 can be run at a faster speed when the one or more flaps 131 are in the lowered position to project the feed over feed trough 120 to the area surrounding feeding device 10. Motor 210 can be configured to turn at different speeds depending on the configuration of the one or more flaps 131. Certain embodiments of feeding device 10 can include a wireless receiver that can be connected to motor 210. A wireless receiver can be configured to receive a signal from a computer device to control the speed or activation of motor 210. In this way, a user can control various functions including but not limited to when feeding device 10 is active and/or how fast the motor is turning from a mobile phone, computer, or other device when not directly present at feeding device 10.

Other embodiments of feeding device 10 can include a wired timer. The wired timer can be connected to motor 210 to control when and for how long motor 210 is active. The wired timer can include a clock that can be programmed with one or more feeding times. Each of the one or more feeding times can also be programmed with a feeding duration. When the wired timer determines that the clock matches one of the one or more feeding times, it can send a signal to activate motor 210. Once the feeding duration has elapsed, the wired timer can send a second signal to motor 210 to turn off.

Figure 3:
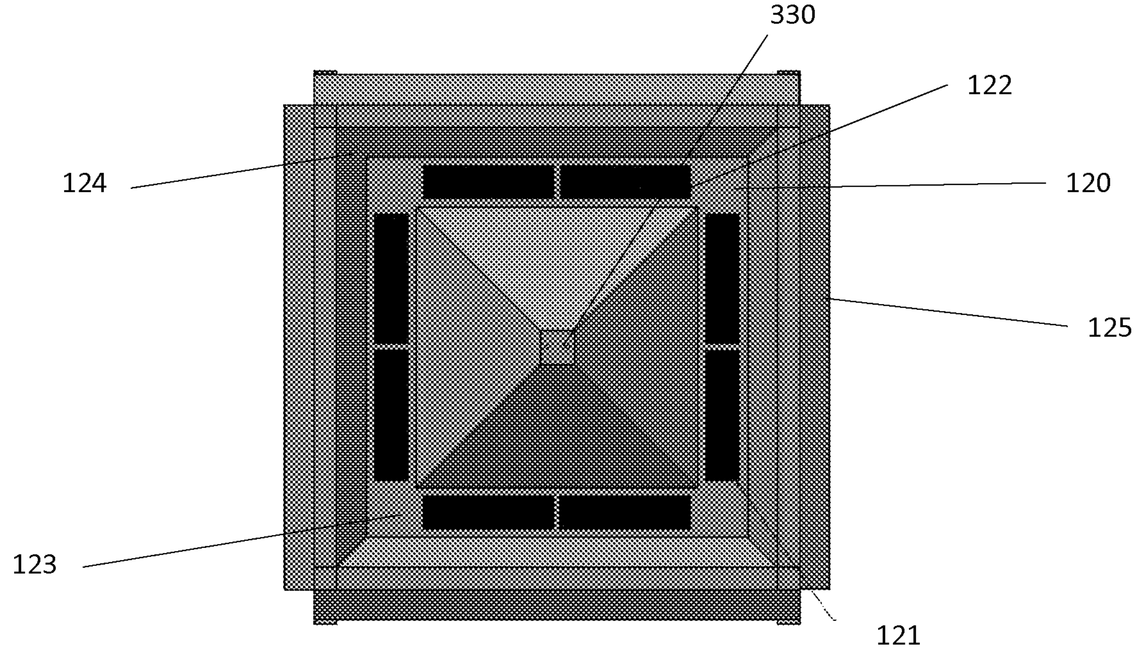
FIG. 3 depicts a top-down view of a feed trough of the feeding device of FIG. 2 according to an embodiment of the present disclosure.

FIG. 3 depicts a top-down view of feed trough 120 of feeding device 10. Feed trough 120 can be positioned below hopper 100 and in certain embodiments can be positioned on four sides of feeding device 10. As described above, feed trough ramp 121 can be configured to allow feed to travel from conversion box assembly 130 into feed trough 120. Feed trough ramp 121 can be positioned in a center of feed trough 120. Feed trough ramp 121 can be a shape that corresponds to the shape of feed trough 120 such that feed can travel down the ramp to all portions of feed trough 120 equally. A top portion of feed trough ramp 121 can have mounting platform 330. Mounting platform 330 can be configured to connect conversion box assembly 130 to feed trough ramp 121. Conversion box assembly 130 can be connected to mounting platform 330 with fasteners including, but not limited to, screws, bolts, other connecting material, or combinations thereof. Feed trough 120 can have a flat bottom that allows the feed to rest on a level surface for the livestock, wildlife, and/or exotic animals to eat from.

Feed trough 120 can have one or more sloped walls 125 opposite feed trough ramp 121 to ensure that the feed does not leave feed trough 120 when being dispersed or during consumption. One or more sloped walls 125 can have a height that is tall enough to prevent feed from escaping feed trough 120, but low enough that the livestock, wildlife, and/or exotic animals can reach the feed in feed trough 120.

The bottom of feed trough 120 can have perforated bottom 122. Perforated bottom 122 can also aid in not allowing water buildup in feed trough 120. Feeding device 10 is durable and can be left in any weather, as there is potential for rain, snow, or other moisture to accumulate in feed trough 120. Perforated bottom 122 can allow that moisture to drain so feed trough 120 can be used for feed without the need to manually extract water. The holes of perforated bottom 122 can be sized smaller than the feed such that only water or other moisture and not the feed itself are falling to the ground. Perforated bottom 122 can be part of the bottom of feed trough 120, or in other embodiments, can be removable panels. Removable panels have the advantage for users who may need to move feeding device 10 to different enclosures for different animals that eat different feeds. The removable panels can have different-sized holes designed for different types and sizes of feed.

Certain embodiments of feed trough 120 can have one or more sides that are shaped and designed to prevent or accommodate different types of livestock, wildlife, and/or exotic animals. Users may wish to use feeding device 10 in a central location that is used by many different types of animals, but the feed may be only intended for one or another type of animal in some embodiments. The different neck and jaw shapes, as well as the presence or absence of horns, of animals allow for one or more sloped walls 125 to be shaped for specific animals. For example, a user may desire that hogs are not able to consume the feed in feed trough 120. The ratio of the depth of feed trough 120 and the height and slope of one or more sloped walls 125 can be designed such that certain animals are able to easily eat from feed trough 120 while hogs are not able to properly reach the feed in feed trough 120. Each side of feed trough 120 can be shaped differently to accommodate different animals. Cattle, hogs, goats, sheep, poultry, horses, bison, donkeys, llamas, alpacas, deer, moose, antelope, kudu, ibex, elk, addax, gazelles, oryx, other livestock and exotic breeds, and combinations thereof may be considered when shaping and sizing feed trough 120.

FIGS. 4A-4D depict perspective views of conversion box assembly 130 of feeding device 10. Conversion box assembly 130 can contain motor 210, one or more distribution blades 250, optional components including but not limited to the wireless receiver, a processor, a wired timer, and combinations thereof. Conversion box assembly 130 can have one or more walls that can form a cube with an open top and bottom. The top can be configured to connect to funnel section 102 of hopper 100, and the bottom can be configured to connect to mounting platform 330. Conversion box assembly 130 can be other shapes to correspond to the shape of funnel section 102 and feed trough 120 without departing from the present disclosure.

Conversion box assembly 130 can also have one or more flaps 131. One or more flaps 131 can be in a raised position or a lowered position. Each of one or more flaps 131 can freely and independently transition between the raised positions and the lowered position. Each of one or more flaps 131 can have hinge 132 that can be configured to transition the one or more flaps between the raised and lowered positions. Some embodiments of hinge 132 can feature a two-pivot hinge 132 to allow a greater range of movement for one or more flaps 131. Depending on the size and shape of conversion box assembly 130 and one or more flaps 131, different types and numbers of hinges 132 may be needed. Each of one or more flaps 131 can have a securing hole 133 that allows one or more flaps 131 to be locked in the raised position.

A portion of the one or more walls of the conversion box assembly 130 can be removable to allow access to motor 210. Maintenance and cleaning of motors can be crucial to the long-term health of the motor so easy access is provided by access door 410. Access door 410 can be removably secured to the body of conversion box assembly 130 with screws, bolts, fasteners, or combinations thereof. Motor 210 can be secured in conversion box assembly 130 and be connected to the one or more distribution blades 250, the one or more flaps 131, optional components including, but not limited to, a wireless receiver, processor, wired timer, and combinations thereof. Motor 210 can be powered by battery, external power source, or combinations thereof. In certain embodiments, a battery for powering motor 210 can be connected to one or more solar panels that can charge the battery.

Figures 4A, 4B:
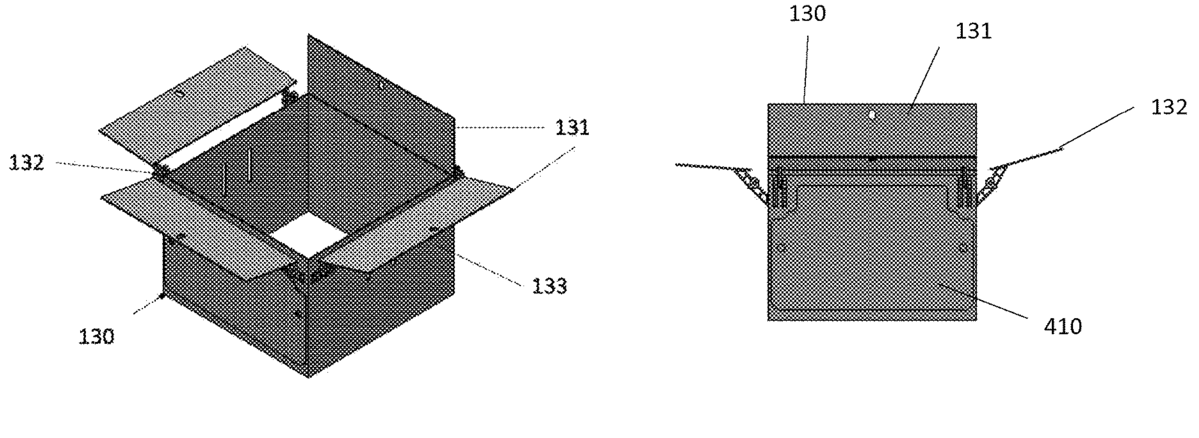
FIGS. 4A-4D depict perspective views of a conversion box assembly according to an embodiment of the present disclosure.
Figure 4D:
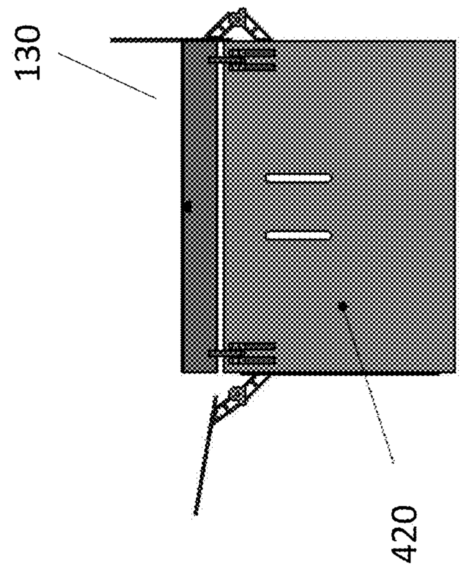

FIG. 4D depicts a side perspective view of conversion assembly box 130. The side depicted in FIG. 4D can have motor adjustment slot 420. Motor adjustment slot 420 can allow access to motor 210 to change the speed or power of motor 210. If feed is being dispersed too far or too hard such that it is escaping the feed trough, the speed of motor 210 can be adjusted.

Figure 4C:
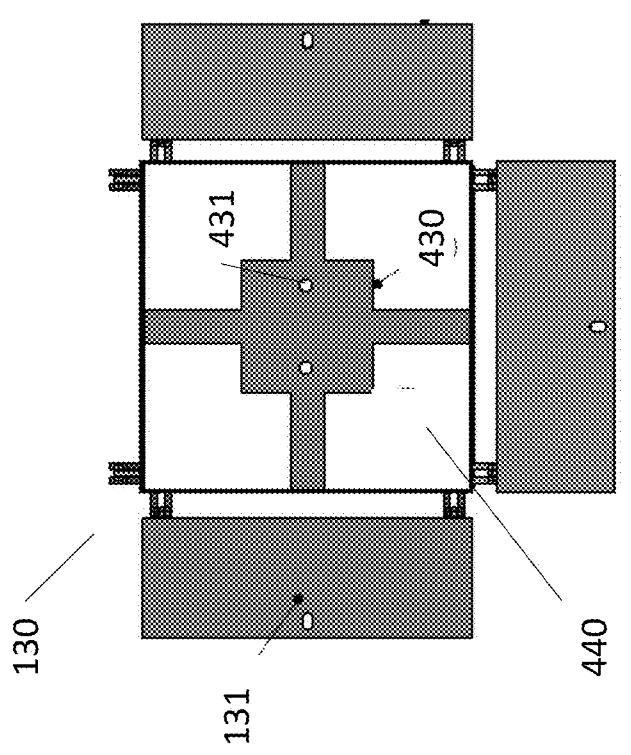

FIG. 4C depicts a top-down view of conversion box assembly 130. Mounting pad 430 can be positioned in the center of conversion box assembly 130. Mounting pad 430 can connect to mounting platform 330 of feed trough 120. Mounting platform 430 can also hold motor 210 and other optional components. One or more distribution blades 250 can be positioned above motor 210 and other optional components. One or more distribution blades 250 can be curved and designed to spin around conversion box assembly 130 ensuring feed is sent to each part of feed trough 120 and/or distributing the feed out around feeding device 10. Motor 210 can spin the one or more distribution blades 250 at a slow rotations per minute (rpm) if the feed is being distributed to feed trough 120. When feed is going to feed trough 120, one or more distribution blades 250 may act as an agitator ensuring there are no clumps in the feed that could back feeding device 10 up and/or ensure that an equal amount of food is being distributed to all sections of feed trough 120.

If one or more flaps 131 are in the lowered position, motor 210 can spin the one or more distribution blades 250 at a significantly faster rpm to throw the food in the area around feeding device 10. By spinning faster, the one or more distribution blades 250 can act similar to a slingshot throwing the feed out past the feed trough and onto the ground surrounding feeding device 10. Depending on the area to be covered by the feed, the user can increase the speed that motor 210 may turn. When the appropriate amount of feed has been disbursed, or a predetermined time has elapsed, motor 210 can stop moving, and a cover can extend over the top or bottom of conversion box assembly 130 to stop the flow of feed. Different embodiments of conversion box assembly 130 can have a cover of different ends.

Other components of conversion box assembly 130 can include, but are not limited to, a wireless receiver, a processor, a wired timer, a scale, and combinations thereof. The optional components can be included to automate functions or allow access to feeding device 10 from anywhere. The wireless receiver can be connected to motor 210 to allow the user to schedule feedings, set the length or amount of feed to be disbursed, transition one or more flaps 131 to a raised or lowered position, and more. The wireless receiver can send signals to motor 210 depending on the signals received from a computer device.

The processor, wired timer, and scale can all be used in different ways to automate process of feeding device 10. A processor can store information about feedings. This can allow feeding device 10 to store information including but not limited to when feedings happen, how long the feedings last, the position of the one or more flaps 131, and more. A wired timer and scale can be used to determine the length of time the dispersal has been happening or the amount of feed, based on weight, that has been dispersed. These tools can allow the user to have full customization options over the use of feeding device 10. All these components are useful and desired by many users, but feeding device 10 without these components is also considered by the disclosure and the lack of these components is included under the disclosure.

Figure 5B:
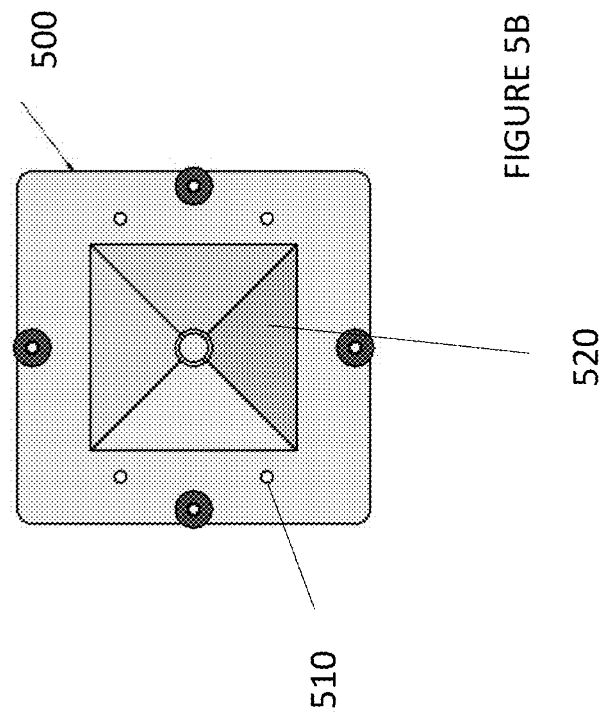
FIGS. 5A and 5B depict perspective views of a vibrator plate according to an embodiment of the present disclosure.
Figure 5A:
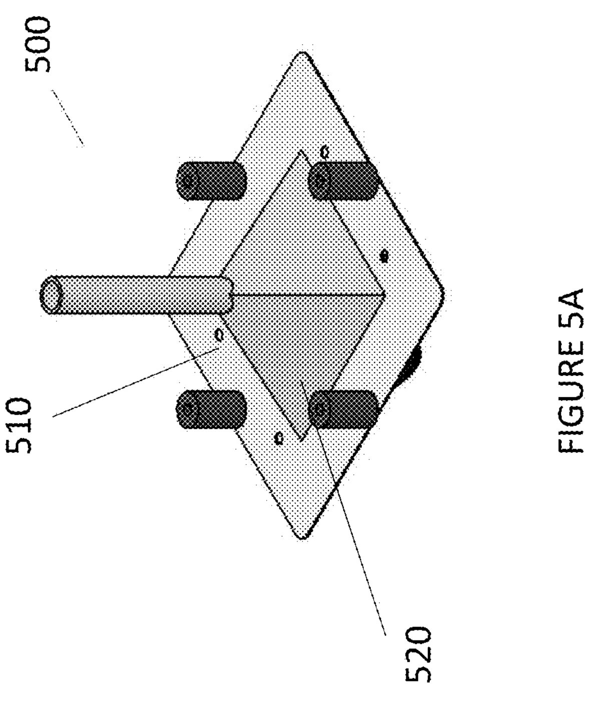

FIGS. 5A and 5B depict perspective views of vibrator plate 500 for feeding device 10. Some feeds used for livestock, wildlife, and/or exotic animals can be molasses-based, or otherwise have a thick or viscous consistency. Feeds with a thicker consistency may not pass through conversion box assembly 130 easily or consistently. If a user is using a feed with a thicker consistency one or more distribution blades 250 can be removed and replaced with vibrator plate 500. Vibrator plate 500 can be configured to translate the motions of motor 210 into vibrations. Conversion box assembly 130 can be removed when vibrator plate 500 is to be used. Once conversion assembly box 130 is removed, vibrator plate 500 and motor 210 can be secured to feeding device 10. Vibrator plate 500 can have mounting holes 510 around the edge. These mounting holes 510 can allow vibrator plate 500 to be secured and connected to motor 210. Vibrator plate 500 can also have plate ramp 520. Plate ramp 520 can have a shape that corresponds to the shape of feeding device 10 and feed trough 120. With a corresponding shape, plate ramp 510 can help ensure that the thick feed is being moved to a position that will allow it to fall into sections of feed ramp 121 of feed trough 120. FIGS. 5A and 5B depict plate ramp 520 that is shaped as a square pyramid, corresponding to the shape of feed ramp 121 in FIG. 3. The thicker feed can come from funnel section 102 onto vibrator plate 500. With motor 210 active, the thicker feed will fall onto plate ramp 510. Vibrator plate 500 will be vibrating from the motion of motor 210, which can cause the thicker feed to travel down plate ramp 520 and onto feed ramp 121. Similar to use with the one or more distribution blades 250, motor 210 speed can be adjusted based on the viscosity of the feed to ensure that there is enough vibration to move the feed to feed trough 120. Motor 210 can still be connected to the wireless receiver, wired timer, and/or scale to ensure that the proper amount of feed is being dispersed at the desired times. Vibrator plate 500 can be used to move large cotton seed feed, molasses feed, other feeds that to not fit in traditional feeders, and combinations thereof. While traditional feeders are only able to allow free choice or free feeding with larger feeds, feeding device 10 is able to use vibrator plate 500 to regulate the amount of feed dispersed in a day.

FIGS. 6A-6C depict views of a vibrator plate according to an embodiment of the present disclosure. More specifically, FIG. 6A depicts wiring tube 26 affixed to a top portion of vibrator adaptor plate ramp 22. FIG. 6B depicts a plurality of mounting holes 25 on vibrator adaptor plate 21. FIG. 6C depicts how the plate ramp is shaped as a square pyramid, corresponding to the shape of feed ramp 121 in FIG. 3.

Figure 7B:
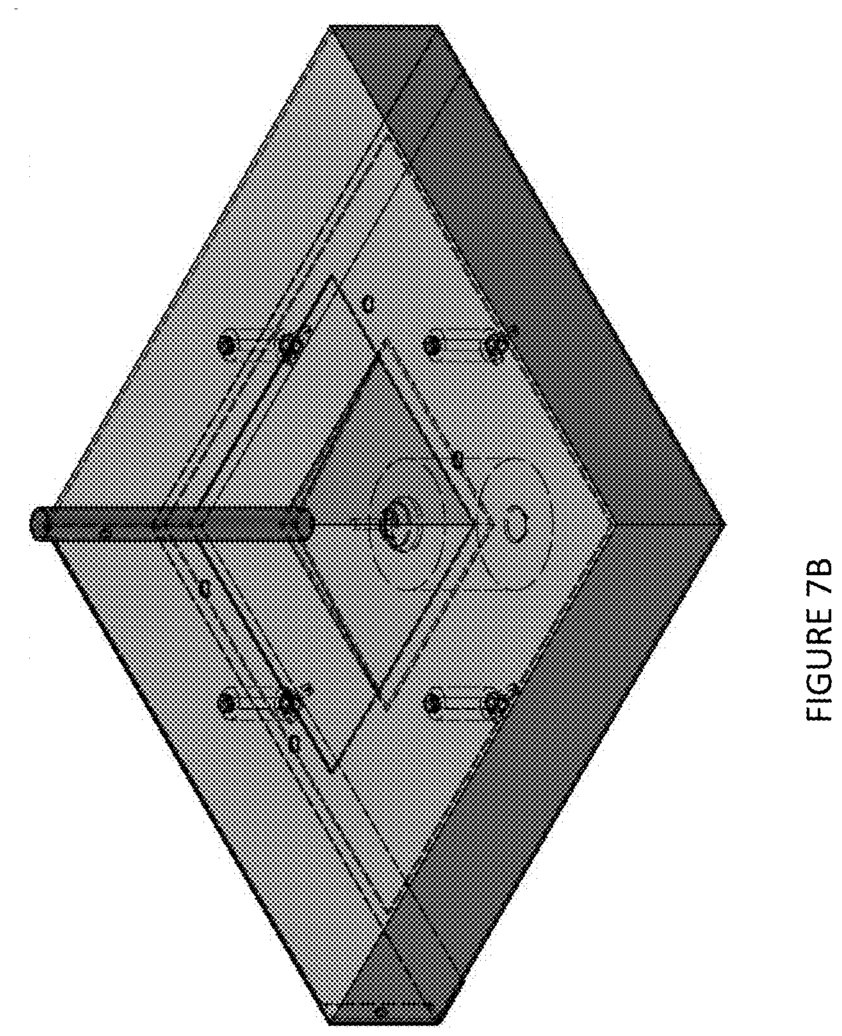
FIGS. 7A-7E depict views of a vibrator motor assembly according to an embodiment of the present disclosure.
Figure 7A:
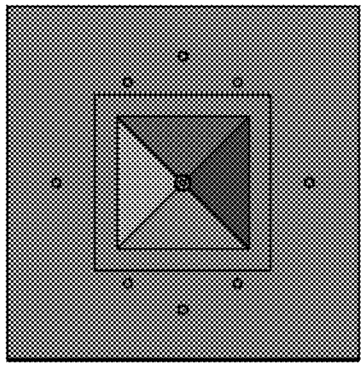
Figures 7C, 7D, 7E:
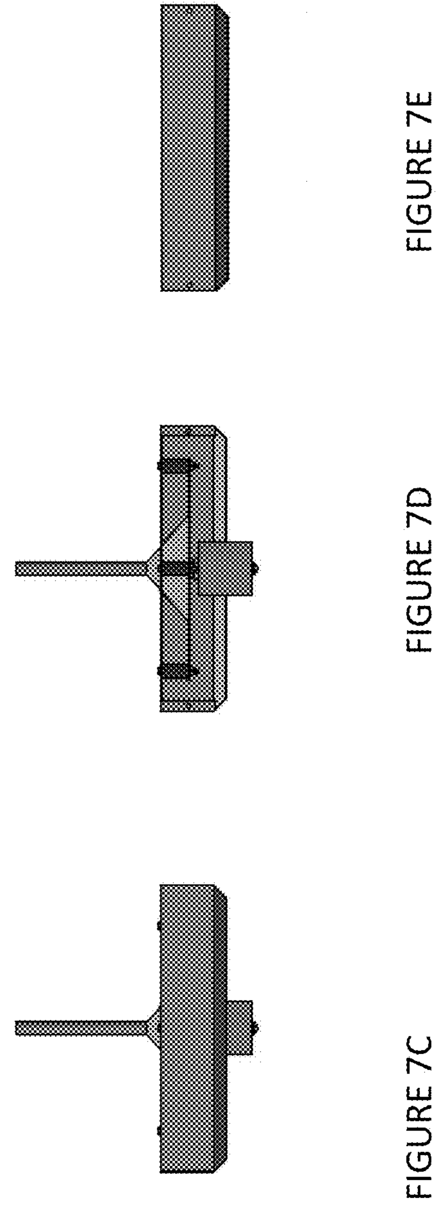

FIGS. 7A-7E depict views of a vibrator motor assembly according to an embodiment of the present disclosure. Similar to FIG. 6C, FIG. 7A depicts a view of how the plate ramp is shaped as a square pyramid. FIG. 7B depicts a view showing in broken lines where the motor may be positioned relative to the wiring tube and plate ramp. FIGS. 7C-7E depict views of the plate relative to the motor in an embodiment of the present disclosure.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

The invention claimed is:

1. A feeding device for dispensing feed for animal consumption, the feeding device comprising:
- a hopper for storing the feed;
- a feed trough operably positioned below the hopper for receiving the feed, the feed trough having a feed ramp;
- a plurality of legs configured to support the feeding device;
- a motor;
- a removable conversion box assembly connected to the hopper and configured to couple to the motor, the conversion box assembly having one or more flaps configured to transition between a raised configuration and a lowered configuration, wherein when the one or more flaps are in the lowered position, the feed is broadcast in an area around the feeding device, and wherein when the plurality of flaps are in the raised position, the feed is directed into the feed trough;
- one or more feed outlet openings in a bottom of the conversion box assembly; and
- a removable vibration plate configured to couple to the motor, the vibration plate configured to use vibration to move feed through the feeding device and disperse the feed;
- wherein the feeding device includes two interchangeable configurations, the first configuration with the conversion box assembly, and the second configuration with the conversion box assembly removed and replaced with the vibration plate.

2. The feeding device of claim 1, wherein the motor is housed in the conversion box assembly in the first configuration.

3. The feeding device of claim 1, wherein the feeding device further comprises:
- one or more removable distribution blades configured to move feed through the feeding device and disperse the feed, wherein the one or more removable distribution blades are removed when the removable vibration plate is used.

4. The feeding device of claim 3, wherein the one or more removable distribution blades are connected to the motor.

5. The feeding device of claim 1, the feeding device further comprising:
- a timer connected to the motor, wherein the timer is configured to send signals to the motor to start and stop.

6. The feeding device of claim 5, wherein the timer stores one or more predetermined feeding times and activates the motor at the one or more predetermined feeding times.

7. The feeding device of claim 1, wherein the feed trough extends the circumference of the feeding device.

8. The feeding device of claim 1, wherein the removable vibration plate is operable with a timer, one or more solar panels, and/or a battery.

9. A feeding device for dispensing feed for animal consumption, the feeding device comprising:

a hopper for storing the feed, the hopper having a top section and a funnel section extending from the top section;

a feed trough operably positioned below the hopper for receiving the feed, the feed trough having a feed ramp;

a plurality of legs extending to the top section of the hopper and configured to support the feeding device;

a motor;

a removable vibration plate configured to couple to the motor, the vibration plate having a plate ramp shaped to correspond to a shape of the feed ramp, wherein the plate ramp is configured to receive thicker feed from the funnel section when the motor is active;

a removable conversion box assembly configured to couple to the motor, the conversion box assembly having one or more flaps configured to transition between a raised configuration and a lowered configuration, wherein when the one or more flaps are in the lowered position, the feed is broadcast in an area around the feeding device, and wherein when the plurality of flaps are in the raised position, the feed is directed into the feed trough; and wherein the feeding device includes two interchangeable configurations, the first configuration with the vibration plate, and the second configuration with the vibration plate removed and replaced with the conversion box assembly.

10. The feeding device of claim 9, wherein the vibration plate is configured to move viscous feed into the feed trough.

11. The feeding device of claim 9 further comprising: one or more feed outlet openings in a bottom of the conversion box assembly.

* * * * *